United States Patent
Han

(10) Patent No.: US 12,343,789 B2
(45) Date of Patent: *__Jul. 1, 2025__

(54) PROCESS FOR MAKING A ONE-PIECE COMPOSITE LINER FOR COLD CHAMBER DIE CASTING APPLICATION

(71) Applicant: Qingyou Han, Stow, OH (US)

(72) Inventor: Qingyou Han, Stow, OH (US)

(73) Assignee: Qingyou Han, Stow, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/660,447

(22) Filed: May 10, 2024

(65) Prior Publication Data
US 2024/0286188 A1    Aug. 29, 2024

Related U.S. Application Data

(62) Division of application No. 17/016,570, filed on Sep. 10, 2020, now Pat. No. 12,017,271.

(51) Int. Cl.
| | |
|---|---|
| *B22D 17/22* | (2006.01) |
| *B22D 17/20* | (2006.01) |
| *B22D 19/00* | (2006.01) |
| *B22F 7/08* | (2006.01) |
| *B32B 15/01* | (2006.01) |
| *C23C 2/06* | (2006.01) |

(Continued)

(52) U.S. Cl.
CPC ..... *B22D 17/2209* (2013.01); *B22D 17/2023* (2013.01); *B22D 17/2245* (2013.01); *B22D 17/2263* (2013.01); *B22D 19/0009* (2013.01); *B22F 7/08* (2013.01); *B32B 15/01* (2013.01); *B32B 15/011* (2013.01); *B32B 15/013* (2013.01); *B32B 15/017* (2013.01); *C23C 2/06* (2013.01); *C23C 2/12* (2013.01); *C23C 28/02* (2013.01); *C23C 28/32* (2013.01); *C23C 28/34* (2013.01); *C23C 30/00* (2013.01)

(58) Field of Classification Search
CPC ............ B22D 17/2209; B22D 17/2023; B22D 17/2245; B22D 17/2263; B22D 19/0009; B22F 7/08; B32B 15/01; B32B 15/011; B32B 15/013; B32B 15/017; C23C 2/06; C23C 2/12; C23C 28/02; C23C 28/32; C23C 28/34; C23C 30/00
See application file for complete search history.

(56) References Cited

U.S. PATENT DOCUMENTS

| | | | | |
|---|---|---|---|---|
| 6,470,550 | B1 * | 10/2002 | Kowalczyk | B22D 19/10 |
| | | | | 228/122.1 |
| 11,090,714 | B1 * | 8/2021 | Donahue | B22D 17/30 |
| 2023/0150016 | A1 * | 5/2023 | Han | B22D 17/2209 |
| | | | | 164/113 |

FOREIGN PATENT DOCUMENTS

JP          2002059251 A    *  2/2002

* cited by examiner

*Primary Examiner* — Rebecca Janssen

(57) ABSTRACT

A process of forming a low cost, erosion, oxidation, and wear resistant one-piece composite liner or insert that can be installed into a shot chamber in a die casting machine is provided. The process utilizes a thin inner layer of refractory metal to serve as the working surfaces of a shot chamber. The thin refractory layer is bonded metallurgically to a thick low cost material to form a one-piece liner thick enough to resist thermal distortion during die casting operation. A self-healing erosive wear resistant coating is applied on the working surface of the refractory metal layer. Such a one-piece composite liner is expected to have an improved service life for die casting of corrosive metals and alloys.

12 Claims, 7 Drawing Sheets

(51) Int. Cl.
    *C23C 2/12*         (2006.01)
    *C23C 28/00*      (2006.01)
    *C23C 28/02*      (2006.01)
    *C23C 30/00*      (2006.01)

-- Prior Art --

PROCESS FOR MAKING A ONE-PIECE COMPOSITE LINER FOR COLD CHAMBER DIE CASTING APPLICATION

GRANT STATEMENT

The present U.S. patent application is a continuation-in-part application of U.S. patent application Ser. No. 17/016,570 filed Sep. 10, 2020. The relevant contents of this prior application are hereby incorporated by reference (in its entirety) into the present disclosure.

FIELD OF THE INVENTION

The present invention relates to die casting, more specifically, to a one-piece oxidation, erosion and wear resistant composite liner for cold chamber die casting of aluminum alloys.

BACKGROUND OF THE INVENTION

Die casting, also termed as high pressure die casting (HPDC), is a widely-used process that entails the injection of a molten metal into a die cavity under high pressure. The metal, commonly aluminum, magnesium, zinc, their alloys, and sometimes copper, titanium, and their alloys, is transported into a chamber containing a cylindrical channel connected to the die cavity, and then is injected with a ram or plunger from the chamber to the die cavity, where it solidifies and forms a solid component. Die casting is generally considered to be a cost-effective process capable of producing precision (net-shape) products at high production rates. Currently, die casting processes are used to produce over 70% of the annual tonnage of all aluminum castings in the United States.

There are two kinds of die casting processes: hot-chamber and cold-chamber die casting [1]. Aluminum castings are made using the cold-chamber die casting process [2]. In the cold-chamber process, a shot sleeve chamber connected to the die cavity receives molten metal poured slowly by a gravity process through a pour hole located distantly from the die cavity. The molten metal stream impacts the inner surface of the shot sleeve opposite to the pour hole at relatively high speeds and subsequently fills the shot sleeve chamber by flowing toward the die cavity. Once the pouring is completed, a ram or plunger is used to quickly push the metal into the die cavity. The plunger slides against the internal surfaces of the chamber at high temperatures as well. Consequently, the shot sleeve at its internal surface suffers severe erosion by the corrosive molten metal and wear by the plunger. The material, which provides the internal surfaces of the shot sleeve, has to withstand both erosion and wear. The internal surface is the working surface for such a shot sleeve.

Traditionally, shot sleeves are made of hot work steels. H13 steel is used widely for making shot sleeve in the United States [3]. Alloys used for making die castings are designed to minimize the dissolution of H13 steel in molten aluminum alloys. As a result, conventional aluminum die casting alloys contain a high content of iron and manganese so that the iron is saturated at pouring temperatures of the molten metal. Still, steel erosion and dissolution are problems which lead to an early failure of the die tooling such as the shot sleeve and the core pins [4-7]. The recent trend in automobile light weighting is pushing the die casting industry to make structural die castings using alloys containing low iron and manganese. Erosion of die tooling becomes a serious issue. It is estimated that when casting these new low iron aluminum alloys, the shot sleeve life is about 10% to 20% of the life of a shot sleeve used for the casting of conventional high iron die casting alloys.

U.S. Pat. No. 3,786,552 to Saito et al. discloses a method of manufacturing a one-piece composite bimetallic shot sleeve to address the erosion issue of the shot sleeve. The shot sleeve is composed of a relatively thin inner layer made of highly infusible materials such as molybdenum, tungsten or their alloys, and an outer layer made of iron-based alloy. The outer layer is made using a mixture of powders by sintering at high temperatures. The inner layer of the shot sleeve resists erosion in processing molten aluminum and the outer layer provides the needed strength of the shot sleeve during die casting operation. However, such a composite shot sleeve is expensive to make not only because of the cost of refractory metals but also because the entire outer layer of the shot sleeve is made using the powder metallurgy route. Furthermore, when the inner liner is damaged, the entire one-piece shot chamber cannot be used anymore.

U.S. Pat. No. 9,114,455 to Donahue et al discloses an improved shot sleeve for die casting of low-iron aluminum silicon alloys and a method for making the shot sleeve. The shot sleeve includes an erosion resistant liner that fits within a bulk H13 steel chamber within a small tolerance. The liner is the inner layer and the H13 steel chamber is the out layer, forming a two-piece shot sleeve. There is no metallurgical bond between these two layers in the two-piece shot sleeve. The idea is that the damaged liner can be replaced with a new liner so that the out layer can be reused. The liner described in U.S. Pat. No. 9,114,455 is selected from refractory metals including titanium, tungsten, molybdenum, ruthenium, tantalum, niobium and etc. The shot sleeve made using this invention lasts longer than that of a one-piece H13 sleeve, but there are still a number of issues. The liner only fits tightly with the bulk steel as there is no bond between them. Consequently, thermal distortion is an issue. A thick liner has to be used in order to reduce its thermal distortion during repeated die casting operations, but a thick liner uses more refractory metals, which are expensive. Oxidation of the refractory metal liner is another issue. Metal loss on the internal surface of the liner opposite to the pour hole is observed. Such metal loss leads to dimensional changes as well. Furthermore, the low hardness of the refractory metal results in wear and scoring on the internal surface of the liner. Donahue et al [8] report on the initial testing of niobium liners inserted into steel sleeves. The casting trials indicated that the plunger tip experienced a higher level of wear which could be related to distortion of the liner and a loose clearance between the plunger tip and the sleeve liner [3, 8].

U.S. Pat. No. 15,463,345 by Han et al. discloses the use of refractory metals for the liner in a gooseneck. No protection of the liner is discussed and no relationship between the liner and the bulk materials of the gooseneck is defined. A thin refractory metal liner without proper protection cannot survive long in an aggressive oxidation, erosion, and wear environment.

Refractory metals have high melting points and excellent thermal fatigue resistance. They are resistant to erosion by molten aluminum [1, 8-10] but are vulnerable to rapid oxidation at elevated temperatures. At temperatures as low as 500° C., which is much lower than the pouring temperature of molten aluminum, oxidation is significant. By 1100° C., the low oxidation resistance of refractory metals can completely preclude their use in air [11]. Also, the hardness of the refractory metals is much lower than H13 steel.

Alloying of the refractory metals improves their hardness to some extent but minimally increases their corrosion resistance [12]. Liners used in the shot sleeve have to be not only erosion resistant but also oxidation and wear resistant as well.

Therefore, there is a need to develop an erosion, oxidation, and wear resistant shot sleeve for cold-chamber die casting applications. Replaceable erosion resistant liners are helpful in extending the service life of these die casting tooling. However, the liner surface should be oxidation, wear and erosion resistant.

There is also a need to reduce the cost of the liner by using a thin inner layer of refractory metal bonded to an outside layer of low-cost metal, forming a one-piece composite liner. Still, the liner needs to be resistant to thermal distortion within its service life during cold-chamber die casting operation.

SUMMARY OF THE INVENTION

In an exemplary embodiment of the present invention, a process of forming a one-piece oxidation, erosion, and wear resistant composite liner that can be installed in a shot sleeve is provided. The process includes the steps of preparing a liner made of refractory metallic materials with melting temperatures higher than 1600° C. and coating the liner with a self-healing coating. Such a composite liner produced using the present invention is expected to have a long service life and minimal thermal distortion during its service in a die casting machine for making die castings.

In another embodiment of the present invention, a process of forming a one-piece oxidation, erosion, and wear resistant composite liner for a shot sleeve is provided wherein the liner material is a refractory metal or its alloys, including niobium, molybdenum, rhenium, tantalum, titanium, or tungsten. The liner is coated with a protective coating which consists of a metal, an alloy, a bonding agent such a solder, or compounds deposited on the liner using physical vapor deposition (PVD), chemical vapor deposition (CVD), hot dipping, sintering, thermal spray, or other surface coating techniques that produces a metallurgical bonding between the coating materials and the liner materials. The composite liner can be installed in a shot sleeve as a one-piece short insert to cover just the local internal surface of the shot sleeve near the pour hole, the entire circular surface of the shot sleeve near the pour hole, or the entire internal surface of the shot sleeve.

In another embodiment of the present invention, a process of forming a one-piece oxidation, erosion, and wear resistant composite liner for a shot sleeve is provided wherein the surface layer of the liner is a self-healing coating consisting of compounds which can be formed between the liner materials and the molten alloys being processed in the shot chamber. One of such self-healing coatings is an aluminide coating which is metallurgically bonded to the liner material for die casting of aluminum alloys. Damaged coatings can be repaired in-situ by the chemical reaction between the liner materials and the molten aluminum alloy being processed in the shot chamber.

Yet in another embodiment of the present invention, a process of forming a low cost and erosion resistant one-piece composite liner for a shot sleeve is provided. The process includes the steps of preparing a thin inner refractory layer made of refractory metallic materials and bonding the inner layer to a thick outer layer made of low-cost materials such as steels, cast irons, or copper alloys. The inner layer is strongly bonded to the outer layer using a bonding method that includes but is not limited to cast-on bonding, diffusion bonding, explosive bonding, hydroforming bonding, roll bonding, sintering, or solder bonding. Such a one-piece composite liner is a cost-effective replacement of a thick refractory metal liner while still maintaining excellent erosion resistance to molten aluminum in the shot sleeve. The one-piece composite liner can be installed in a shot sleeve as a short insert to cover just the local internal surface of the shot sleeve near the pour hole, the entire circular interface of the shot sleeve near the pour hole, or the entire internal surface of the shot sleeve.

Yet in another embodiment of the present invention, a process of forming a low cost and oxidation, erosion and wear resistant one-piece composite liner for a shot sleeve is provided. The process includes the steps of preparing a thin inner refractory layer made of refractory metallic materials, bonding the inner layer to a thick outer layer made of low cost materials such as steels, copper alloys or cast irons, and coating the refractory material layer with a protective or self-healing coating. The refractory material layer is strongly bonded to the outer layer using a bonding method that includes but is not limited to cast-on bonding, diffusion bonding, explosive bonding, hydroforming bonding, roll bonding, sintering, or solder bonding. The refractory metallic material layer is coated with a protective coating which consists of a metal, an alloy, a bonding agent such a solder, or compounds deposited on the liner using physical vapor deposition (PVD), chemical vapor deposition (CVD), hot dipping, sintering, thermal spray, or other surface coating techniques. The resultant composite liner can be installed in a shot sleeve as a short insert to cover just the local internal surface of the shot sleeve near the pour hole, the entire circular interface of the shot sleeve near the pour hole, or the entire internal surface of the shot sleeve. Such a composite liner is a cost effective replacement of thick refractory metal liner that maintains an excellent erosion resistance to molten aluminum in the shot sleeve and has improved oxidation resistance and wear resistance compared to the conventional refractory metal liner.

DETAILED DESCRIPTION OF THE INVENTION

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

The primary function of a shot sleeve is to receive and hold the molten metal after pouring [3]. The shot sleeve also provides a pressure chamber to contain the molten metal during injection and intensification. The quality of die castings depends on many factors including the ability of the shot sleeve to convey the molten metal into the die cavity. It is essential that the inside of the shot sleeve be smooth, round, straight and uniform to allow the appropriate velocities and pressure rise times required for precise die filling and intensification [3, 13]. The shot sleeve is exposed to extremely severe conditions as during operation the molten metal above 660° C. impacts the inside wall of the shot chamber, the sleeve temperatures can approach the temperature of the molten metal, the plunger can reach velocity of 6 m/s or more, and metal pressures can be as high as 25,000 psi [14]. Consequently, shot sleeves normally fail due to erosion under the pour hole, wear and scoring on the internal surface, and thermal fatigue producing small cracks. Erosion failure is one of the major reasons for a shorter life of a shot sleeve especially when the sleeve is used for the die casting of low iron aluminum alloys. Composite shot sleeves are designed to separate the section of the inner layer of a sleeve containing the pour hole to the main body of the sleeve, allowing just that section to be replaced when severe erosion under the pour hole occurs. The goal for most die casters is to maximize the life of their sleeves while controlling costs.

Figure 1:
FIG. 1 schematically represents composite shot sleeves used in the cold-chamber die casting process.

FIG. 1 illustrates two types of composite shot sleeve used in the die casting industry: one with a short insert or liner and the other with a long liner which covers the entire length of the internal surface of a shot sleeve. The term "liner" or "insert" here refer both the short and long one shown in FIG. 1.

Figure 2A:
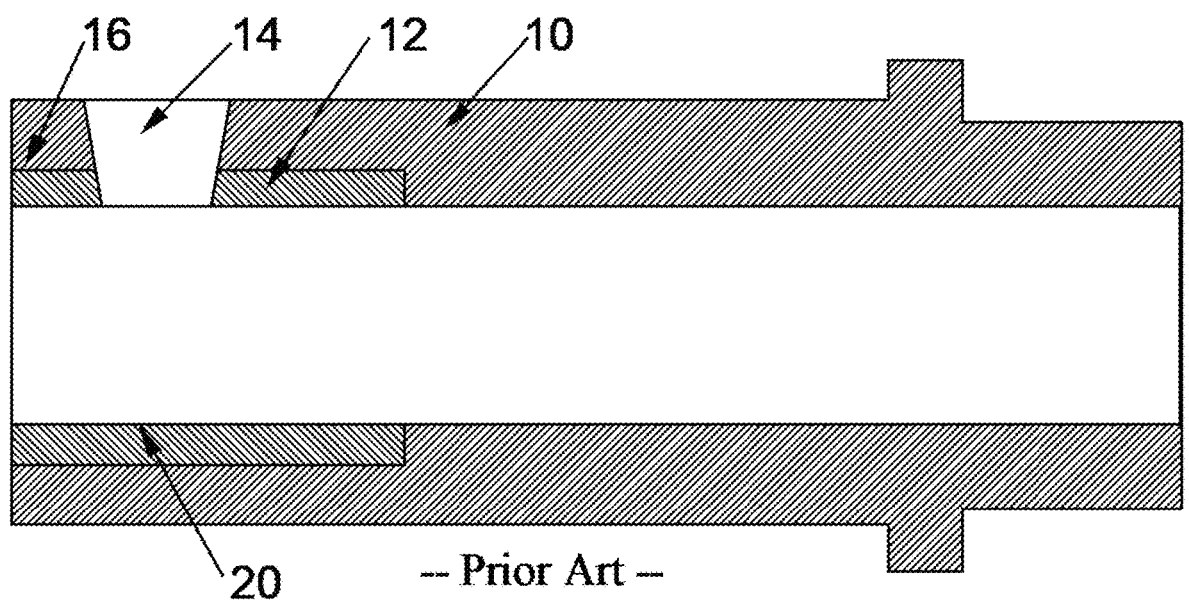
FIG. 2A is a schematic side view of a layout of a prior art on a design of a composite shot sleeve.
Figure 2B:
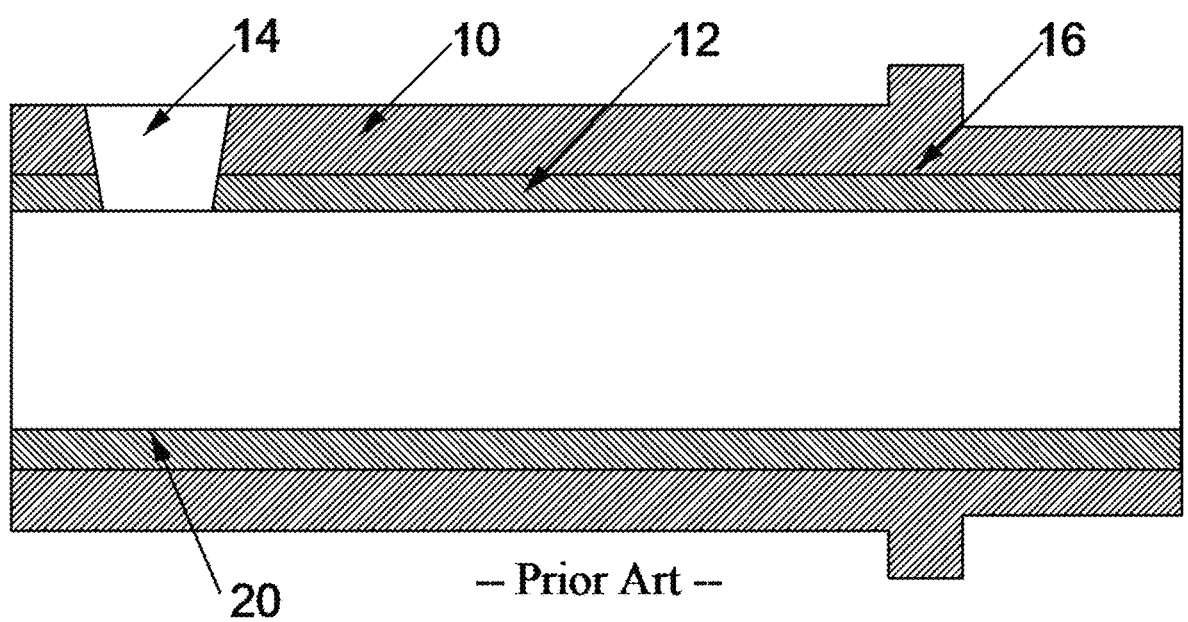
FIG. 2B is a schematic side view of a layout of a prior art on a design of a composite shot sleeve.

FIGS. 2A and 2B are vertical sections of these two types of composite shot sleeve. The small hole 14 on the top of the shot sleeve is the pour hole. Molten metal is poured through the pour hole 14 and impacts the bottom inside wall of the shot chamber opposite the pour hole at the impingement site 20. A composite shot sleeve consists of two parts: an outer layer 10 and an inner layer 12. The inner layer 12 can be a short insert or liner forming the internal surface of the sleeve near the pour hole 14 or a liner covering the entire internal surface of the sleeve. The insert or the liner 12 can be made of similar or dissimilar material to the outer layer of the sleeve. The insert or liner 12 is installed in the outer layer 10 with a tight interface 16 with a small tolerance. During die casting operation, the molten metal impact the impingement site 20 repeatedly, gradually forming an erosion dent there. When the dent is deeper than a few millimeters, the liner is considered damaged.

U.S. Pat. No. 3,786,552 to Saito et al. and U.S. Pat. No. 9,114,455 to Donahue et al. disclose the use of refractory metals as the materials for the entire liner 12, but these prior arts for the fabrication of composite shot sleeves have issues with the costs of sleeve fabrication and the service life of the sleeves.

Figure 3:
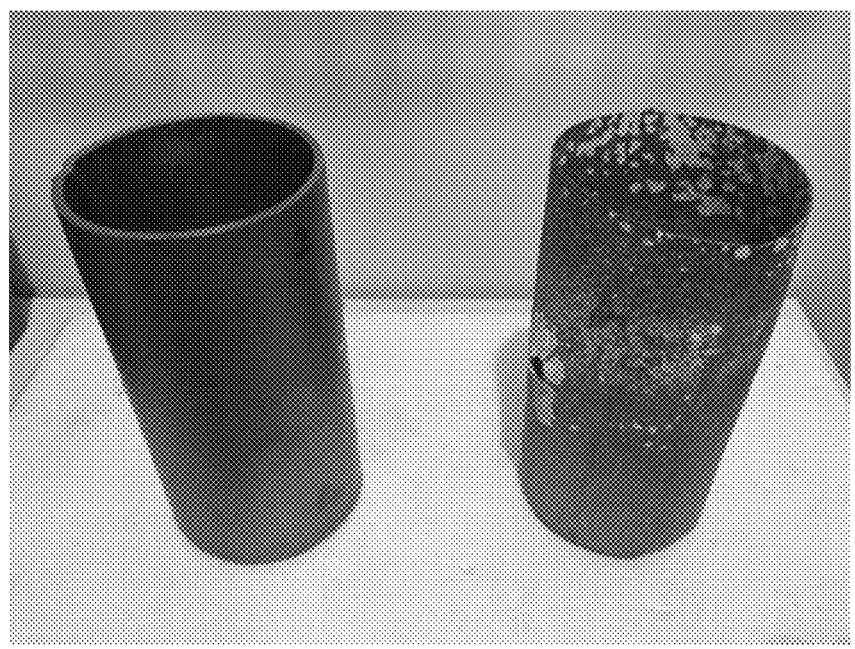
FIG. 3 shows photographs of Nb alloy tubes suffering from mass loss in an oxidation environment.

Refractory metals usually have a poor oxidation resistance [3-4]. FIG. 3 illustrates niobium tubes used for melting aluminum alloys in the temperature range of 650 to 750° C. The left side tube is a new one and the right side one is a used one. The wall-thickness of the new tube is about 2 mm and the wall-thickness of the used one is only less than 0.5 mm. A significant amount of niobium metal is lost due to the formation of niobium oxide scales which spall off the tube because the oxides have much smaller thermal coefficients than the metal.

Two niobium lined composite shot sleeves were made according to U.S. Pat. No. 9,114,455 to Donahue et al. One shot sleeve was used for over 6,000 cycles which lasted longer than the H13 shot sleeves. However, a dent was formed at 20 shown in FIG. 2B on the inside surface of the shot sleeve opposite the pour hole where the molten metal impinged the internal surface of the shot sleeve. Erosion did not appear to happen at this area, so the mass loss was due to oxidation.

The present invention describes new ideas in the manufacturing of the liner or insert for a cold-chamber die casting shot sleeve shown in FIGS. 2A and 2B. Instead of a liner 12 composed of a single metal, either steel or refractory metal as disclosed in prior arts, a one-piece composite liner with a multiple layered structure is described. Each layer in the composite liner contains materials designed to serve unique purposes such as extending the service life and/or reducing the production costs of the liner in a shot sleeve for cold-chamber die casting operations.

Figure 4:
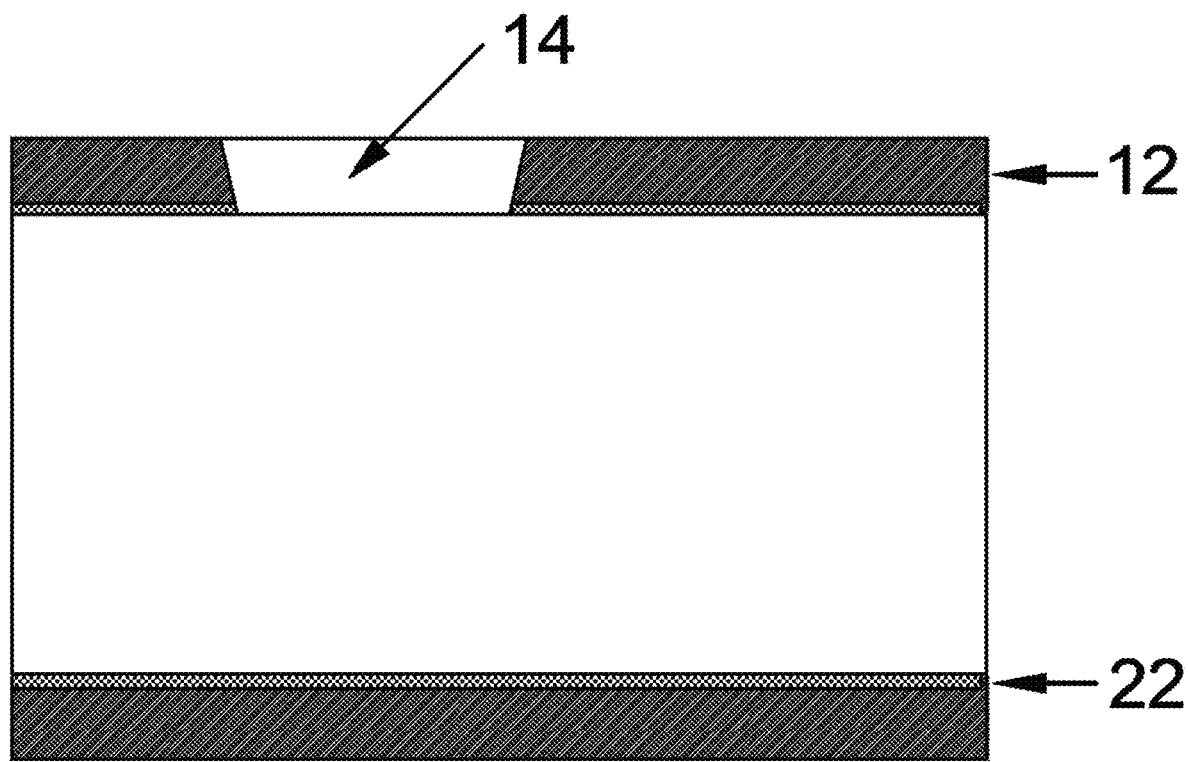
FIG. 4 is a schematic view of a layout of one embodiment of the present invention.

In a preferred embodiment, the present invention relates to a method for forming a one-piece oxidation, erosion, and wear resistant composite liner in a shot sleeve for cold-chamber die casting applications. FIG. 4 depicts the one-piece composite liner, consisting of the main body of a refractory liner 12 with a layered structure. The layers are metallurgically bonded to form a one-piece liner. The liner can be in various shapes including a short circular tube containing the pour hole 14, a long circular tube containing the pour hole 14 and covering the entire internal surface of a shot sleeve (not shown in FIG. 4), and a pad that covers the region of a shot sleeve under the pour hole, i.e., the region containing 20 shown in FIG. 2A, where severe erosion is known to occur. The internal surface of the refractory metal liner or the insert 12 shown in FIG. 4 is coated with a layer of self-healing coating 22 that is metallurgically bonded to the liner 12. The oxidation and wear resistance of the liner 12 are provided by the self-healing coating 22 on the internal surface of a refractory metallic alloy liner 12. The erosion resistance of the shot sleeve is provided by compounds formed between the cast material, i.e. aluminum alloy, and the refractory metal in the liner 12 after the coating fails. The term "self-healing coating" is defined as a coating that, if damaged, can be repaired in-situ by chemical reactions between the bulk liner materials and the molten alloy processed in the shot chamber, forming similar or dissimilar compounds to that of the original coating on the damaged sites. The purpose of using an initial coating on the refractory metal liner is to protect the liner from oxidation during its fabrication process before the liner is in contact with liquid metal. The initial coating can be damaged by the molten metal in the shot chamber with the liner. However, as long as the damaged site can be filled or replaced immediately by newly formed materials due to the chemical reactions between the molten metal and the materials on the surface of the liner, a protective layer of coating is formed on the surface of the liner. By such a definition of the self-healing coating, any coating that is suitable for protecting refractory metals from oxidation may be used as the initial coating on the refractory liner. The thickness of the coating is suggested to be in the range of 1 to 100 micrometers, preferably in the range of 5 to 20 micrometers. Such a coating includes but is not limited to silicide and nitride coatings, hot dipping and plating of various metals and alloys such as aluminum alloy, tin, silver, nickel, and zinc alloy, laser printing of metals and alloys, arc surface alloying, spray forming of metals and alloys, and PDV and CVD of various compounds.

For a liner made of niobium, tungsten, molybdenum, titanium, and their alloys, an aluminizing coating is one of the preferred surface coatings [15-16]. This is because aluminizing produces a metallurgical bond between the refractory metal liner and aluminides. The bond consists of line compounds at the interface between a refractory metal and molten aluminum. These line compounds have high melting temperatures and thus are resistant to erosion and soldering by molten aluminum [5]. As a line compound, its composition falls within a very narrow range as diffusion of elements across this compound becomes difficult because composition difference is the driving force for elemental diffusion and erosion is a diffusion-controlled process. Furthermore, the line compound usually has a high hardness which is good in resisting wear in the shot chamber by the plunger. Niobium, for instance, reacts with molten aluminum and forms a line compound, $NbAl_3$. The melting temperature of this compound is 1760° C., much higher than the melting temperature of aluminum (660° C.). Aluminum at the external surface of the compound is resistant to oxidation at elevated temperatures. This line compound, if damaged on the liner surface, can be replaced in-situ with newly formed line compounds in the next cycle of die casting when the liner is in contact with molten metal. Aluminum metal can be deposited on niobium alloys (or molybdenum and its alloys) using hot dipping, chemical vapor deposition, laser printing, fused salt processes, and physical vapor deposition. Aluminum deposited on the refractory metal can then be heat treated to improve the formation of aluminides.

The composite liner described in FIG. 4 can be installed mechanically into a shot sleeve as a one-piece short insert to cover just the internal surface of the shot sleeve near the pour hole 14 or the entire internal surface of the shot sleeve as illustrated in FIGS. 1, 2A, and 2B.

Another issue with the use of a composite shot sleeve described by U.S. Pat. No. 9,114,455 to Donahue et al. is the costs associated with the use a thick refractory liner. Conventional methods for fabricating a composite shot sleeve with a refractory metal liner involve using a rough chamber of wrought H13 steel, machining to expand portion of its internal diameter, and inserting the liner tightly into the shot sleeve with a small tolerance. The liner has to be thick enough to reduce thermal distortion during its service. Refractory metals are expensive, so the use of a thick refractory metal increases the costs of the shot chamber substantially. A shot sleeve with a thin niobium liner was built and tested [8-9] in order to reduce costs. After this shot sleeve was used for around 300 shots or cycles, the liner was pushed towards the dies/molds due to its plastic deformation, leaving a gap at the ram end. Such a gap decreases the service life of the ram. It is also a safety concern. Obviously, a much thicker niobium liner is needed. Tungsten liners used in the die casting industry are usually much thicker than 12 millimeters. The costs of refractory metals are a few hundred times of that of H13 steel. A composite shot sleeve design that is capable of reducing the use of refractory metal is extremely beneficial.

Figure 5:
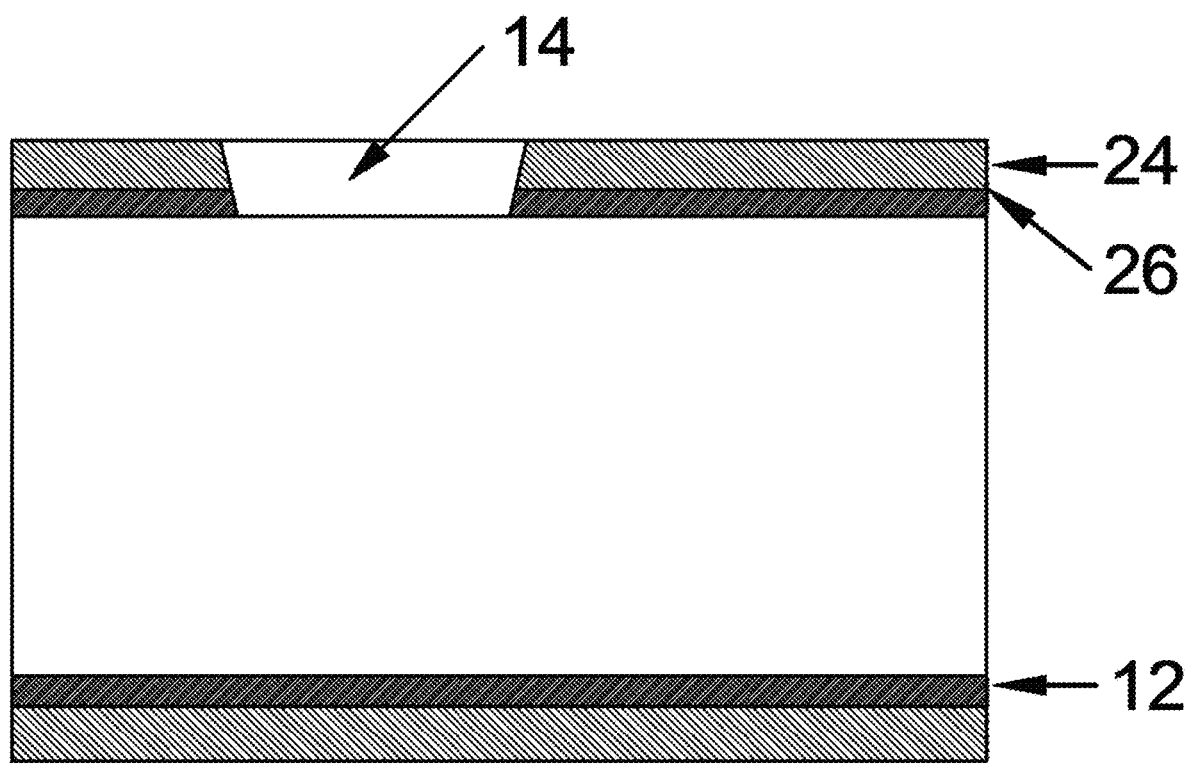
FIG. 5 is a schematic view of a layout of one embodiment of the present invention.

In another preferred embodiment, the present invention relates to a method for forming a one-piece erosion composite liner or insert in a shot sleeve for cold-chamber die casting applications. The idea is illustrated in FIG. 5. The one-piece composite liner consists of a thin inner layer of refractory metal 12 having an internal surface and an external surface, a thick outer layer 24 having an internal surface and an external surface. The external surface of the thin inner layer is metallurgically bonded to the internal surface of the thick outer layer 24 of a low cost metal to form the one-piece composite liner that is thick enough to withstand thermal distortion during repeated die casting operation. The thickness of the thin layer 12 is about a few millimeters, usually between 0.5 to 5 mm. The total thickness of such a one-piece liner is usually greater than 12 mm. The one-piece composite liner can be of various shapes including a short circular tube containing the pour hole 14, a long circular tube containing the pour hole 14 and covering the entire internal surface of a shot sleeve (not shown in FIG. 5), and a pad that covers the region of a shot sleeve under the pour hole, i.e., the region containing 20 shown in FIG. 2A, where severe erosion is known to occur. The thin inner layer 12 can cover the entire internal surface of the outer layer 14 as shown in FIG. 5 or just cover the region under to the pour hole of the outer layer 14 where severe erosion is known to occur. The refractory metal for the inner layer 12 includes but is not limited to either niobium, molybdenum, titanium, tungsten metal or its alloy. The low-cost metal for the outer layer 24 of the composite liner/insert includes but is not limited to steel, cast iron, or a copper alloy. The inner layer 12 and the outer layer 24 materials are metallurgically bonded at their interface 26 using a bonding method that includes but is not limited to cast-on bonding [17], diffusion bonding, explosive bonding, hydroforming bonding, rolling bonding, sintering, or solder bonding. The refractory metal in the inner layer 12 of the composite liner provides erosion resistance. The low-cost material in the outer layer 24 provides the required strength and stiffness for the composite liner or an enhanced thermal diffusivity to assist thermal management of the shot sleeve. The strong bond, ideally a metallurgical bond, ensures that the thin inner layer 12 is strongly held by the outer layer material 24 to minimize thermal distortion of the composite liner. Such a one-piece composite liner is a cost-effective replacement of the thick refractory metal liner described by U.S. Pat. No. 9,114,455 to Donahue et al. while still maintaining excellent erosion resistance to molten aluminum in the shot sleeve. The one-piece composite liner can be installed mechanically in a shot sleeve either as a short insert to cover just the internal surface of the shot sleeve near the pour hole 14 or the entire internal surface of the shot sleeve as illustrated in FIGS. 1, 2A, and 2B.

Figure 6:
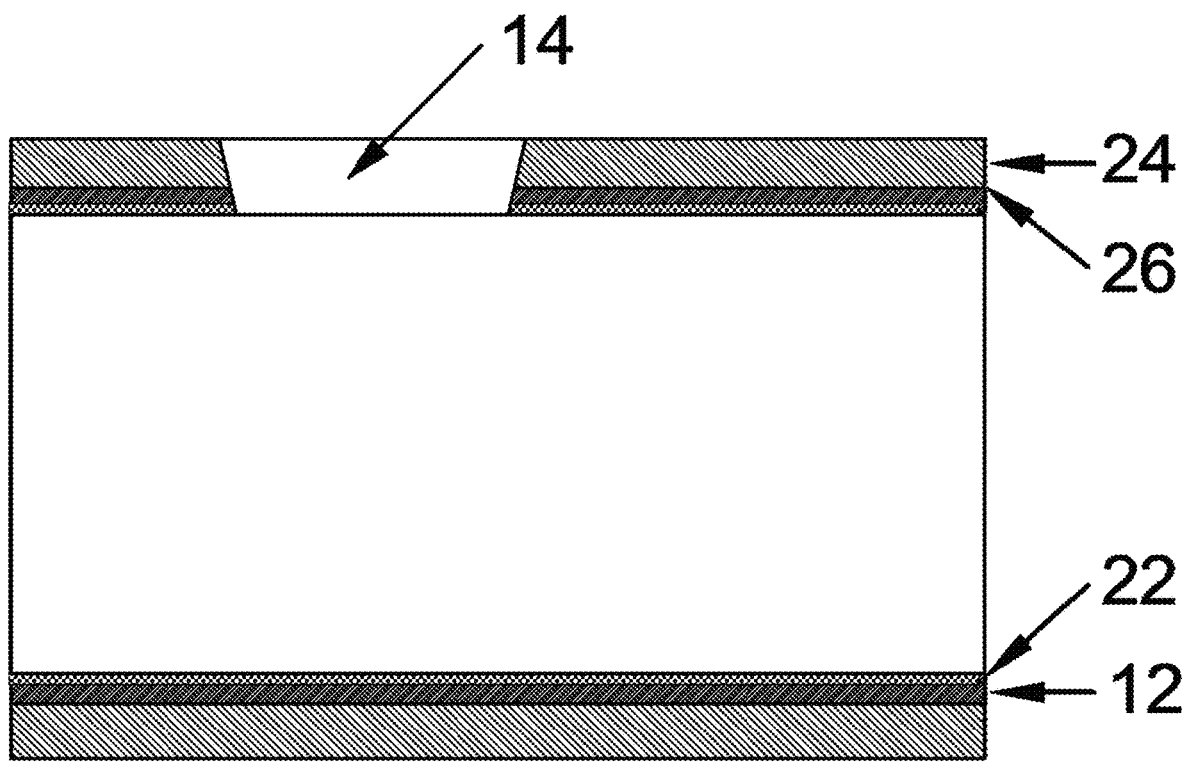
FIG. 6 is a schematic view of a layout of one embodiment of the present invention.

Yet in another preferred embodiment, the present invention relates to a method for forming a one-piece oxidation, erosion, and wear resistant composite liner in a shot sleeve for cold-chamber die casting applications. The idea is illustrated in FIG. 6. The bulk of the liner/insert is made using low cost materials such as steels as the outer layer 24. The one-piece composite liner consists of a thin inner layer of refractory metal 12 having an internal surface and an external surface, a thick outer layer 24 having an internal surface and an external surface. The external surface of the thin inner layer is metallurgically bonded to the internal surface of the thick outer layer 24 of a low cost metal to form the one-piece composite liner that is thick enough to withstand thermal distortion during repeated die casting operation, i.e., the thin layer 12 of refractory metal is metallurgically bonded at the interface 26 between the thin layer 12 and the thick layer 24. The internal surface of the thin inner layer of a refractory metal 12 is coated with a layer of self-healing coating 22 that is strongly bonded to the refractory metal layer 12. Thus, the composite liner illustrated in FIG. 6 is a one-piece composite liner consisting a three-layered structure and is thick enough to withstand thermal distortion during repeated die casting operation. The thickness of the thin layer 12 is about a few millimeters, usually between 0.5 to 5 mm. The total thickness of such a one-piece liner is usually greater than 12 mm. The one-piece composite liner can be of various shapes including a short circular tube containing the pour hole 14, a long circular tube containing the pour hole 14 and covering the entire internal surface of a shot sleeve (not shown in FIG. 6), and a pad that covers the region of a shot sleeve under the pour hole, i.e., the region containing 20 shown in FIG. 2A, where severe erosion is known to occur. The thin layer 12 can cover the entire internal surface of the outer layer 14 as shown in FIG. 6 or just cover the region under to the pour hole of the outer layer 14 where severe erosion is known to occur.

The refractory metal in layer 12 includes but is not limited to either niobium, molybdenum, titanium, tungsten metal or its alloy. The low-cost metal for the outer layer 24 of the composite liner/insert includes but is not limited to steel, cast iron, or copper alloy. The inner layer 12 and the outer layer 24 materials are metallurgically bonded at their interface 26 using a bonding method that includes but is not limited to cast-on bonding [17], diffusion bonding, explosive bonding, hydroforming bonding, rolling bonding, sintering, or solder bonding. The refractory metal in the inner layer 12 of the composite liner provides erosion resistance. The low-cost material in the outer layer 24 provides the strength and stiffness for the composite liner. The strong bond, ideally a metallurgical bond, ensures that the thin inner layer 12 is strongly held by the outer layer material 24 to minimize thermal distortion of the composite liner.

As discussed above, the oxidation and wear resistance of the shot sleeve are provided by the self-healing coating 22 on the internal surface of a refractory metallic alloy liner 12. The erosion resistance of the shot sleeve is provided by compounds formed between the cast material, i.e. aluminum alloy, and the refractory metal in the liner 12 after the coating fails. The term "self-healing coating" is also defined as a coating that, if damaged, can be repaired in-situ by chemical reactions between the bulk liner materials and the molten alloy processed in the shot chamber, forming similar or dissimilar compounds to that of the original coating on the damaged sites. The purpose of using an initial coating on the refractory metal liner is to protect the liner from oxidation during its fabrication process before the liner is in contact with liquid metal. The initial coating can be damaged by the molten metal in the shot chamber with the liner. However, as long as the damaged site can be filled or replaced immediately by newly formed materials due to the chemical reaction between the molten metal and the materials on the surface of the liner, a protective layer of coating is formed on the surface of the liner. By such a definition of the self-healing coating, any coating that is suitable for protecting refractory metals from oxidation may be used as the initial coating on the refractory liner. The thickness of the coating is suggested to be in the range of 1 to 100 micrometers, preferably in the range of 5 to 20 micrometers. Such a coating includes but is not limited to silicide and nitride coatings, hot dipping and plating of various metals and alloys such as aluminum alloy, tin, silver, nickel, and zinc alloy, laser printing of metals and alloys, arc surface alloying, spray forming of metals and alloys, and PDV and CVD of various compounds. Such a composite liner shown in FIG. 6 is a cost-effective replacement of thick refractory metal liner while still maintaining excellent erosion resistance to molten aluminum and increasing the wear resistance to the ram in the shot sleeve. The one-piece composite liner can be installed in a shot sleeve either as a short insert to cover just the internal surface of the shot sleeve near the pour hole 14 or the entire internal surface of the shot sleeve as illustrated in FIGS. 1, 2A, and 2B.

While the invention has been described in connection with specific embodiments thereof, it will be understood that the inventive methodology is capable of further modifications. This patent application is intended to cover any variations, uses, or adaptations of the invention following, in general, the principles of the invention and including such departures from the present disclosure as come within known or customary practice within the art to which the invention pertains and as may be applied to the essential features herein before set forth and as follows in scope of the appended claims.

REFERENCES

1. Q. Han, C. Vian, and J. Good, "*Application of Refractory Metals to Facilitate Hot Changer Aluminum Die Casting,*" International Journal of Metalcasting, vol. 14, 2020, to be published.
2. Q. Han, and J. Zhang, "*Fluidity of Alloys under High-Pressure Die Casting Conditions: Flow-Choking Mechanisms,*" Metallurgical and Materials Transactions B, vol. 51 (4), 2020, pp. 1795-1804.
3. A. B. William, and S. Midson, *Shot System Components User's Guide*, NADCA Publication: 525, NADCA 2016.
4. J. Song, T. DenOuden, and Q. Han, "Soldering Analysis of Core Pins", *NADCA Transactions* 2011, T11-062.
5. Q. Han, and S. Viswanathan, "Analysis of the Mechanism of Die Soldering in Aluminum Die Casting", *Metallurgical and Materials Transaction A*, vol. 34A, (2003), pp. 139-146.
6. Y. Chu, P. Cheng, and R. Shivpuri "A Study of Erosive Wear in Die Casting Dies: Surface Treatments and Coatings," *NADCA Transactions* 1993, pp. 361-371.
7. Q. Han, "Mechanism of Die Soldering during Aluminum Die Casting," *China Foundry*, vol. 12 (2), (2015), pp. 136-143.
8. R. Donahue, S. Knickel, P. Schneider, M. Witzel, J. Melius, and A. Monroe, "Performance of Shot Sleeve with Different Refractory Metal Liners in Casting of Structural Aluminum Die Casting Alloy 362", *NADCA Transactions* 2014, T14-011.
9. R. Donahue, "Avoiding Washout in Shot Sleeve When Used with Low Iron, Structural Aluminum Die Casting Alloys", *NADCA Transactions* 2013, T13-051.
10. Z. Liu, Q. Han, and J. Li, "Ultrasound Assisted in situ Technique for the Synthesis of Particulate Reinforced Aluminum Matrix Composites," *Composites Part B: Engineering*, vol. 42, 2011, pp. 2080-2084.
11. C. L. Briant, "The properties and Uses of Refractory Metals and Their Alloys," *High Temperature Silicides and Refractory Alloys*, C. L. Briant et al eds., Materials Research Society Symposium Proceedings, vol. 322, 1994, pp. 305-314.
12. J. B. Lambert, "Refractory Metals and Alloys," ASM Handbook, vol. 2, 1990, pp. 557-565.
13. Bob McClintic, "Die and Plunger Lubrication and Plunger Tips," Die Casting Engineer, September 2009, p 14.
14. A. L. Murphy, "Extending the Life of Shot Sleeves," Die Casting Engineer, March-April 1973, p. 10.
15. G. Slama, and A. Vignes, "Coating of Niobium and Niobium Alloys with Aluminum. Part I. Pack-Cementation Coating," *Journal of the Less Common Metals*, vol. 23, No. 4, 1971, pp. 375-393.

16. G. Slama, and A. Vignes, "Coating of Niobium and Niobium Alloys with Aluminum. Part II. Hot-Dipped Coating," *Journal of the Less Common Metals*, vol. 24, No. 1, 1971, pp. 1-21.
17. Q. Han, "A Modified Cast-on Method for the Reinforcement of Aluminum Castings with Dissimilar Metals," *Metallurgical and Materials Transactions B*, vol. 47 (6), pp. 3266-3273.

The invention claimed is:

1. A method for forming a low cost and erosion resistant one-piece composite liner or insert, the method comprising the steps of:
    preparing a thin inner layer of refractory metallic material having a melting temperature higher than 1600° C. wherein the thin inner layer consists of an internal surface and an external surface;
    preparing a thick outer layer of metallic material wherein the thick outer layer consists of an internal surface and an external surface; and
    bonding the external surface of the thin inner layer metallurgically with the internal surface of the thick outer layer, and
    whereby said thin inner layer and said thick outer layer are joined to form the one-piece composite liner or insert that can be mechanically installed into or removed from a shot chamber in a cold-chamber die casting machine.

2. A method of claim 1, wherein the refractory metallic material for the thin inner layer includes niobium, molybdenum, rhenium, tantalum, titanium, tungsten metal, or alloys thereof.

3. A method of claim 1, wherein the thin inner layer has its thickness in a range of about 0.5 to 5 millimeters.

4. A method of claim 1, wherein the metallic material for the thick outer layer includes steels, cast irons, or copper alloys.

5. A method of claim 1, wherein the thin inner layer and the thick outer layer is bonded using a method including cast-on bonding, diffusion bonding, explosive bonding, roll bonding, powder metallurgy bonding, sintering, and solder bonding.

6. A method of claim 1, wherein the thin inner layer covers and is bonded to the thick outer layer in a region under pour hole of the shot chamber.

7. A method of claim 1, wherein the external surface of the thin inner layer covers and is bonded to the entire internal surface of the thick outer layer.

8. A method of claim 1, wherein the internal surface of the thin layer is coated with a layer of coating.

9. A method of claim 8, wherein said coating is a metalized coating applied by using plating, hot dipping, cementation-packing, laser-printing, thermal spring, or arc surface alloying.

10. A method of claim 8, wherein said coating is an oxidation resistant coating used for protecting a refractory metal from oxidation.

11. A method of claim 8, wherein said coating includes a carbide, nitride, oxide, silicide, and TiAlN coating.

12. A method of claim 8, wherein thickness of said coating is in the range of about 1 to 100 micrometers.

\* \* \* \* \*